United States Patent [19]

Upatnieks

[11] Patent Number: 4,711,512

[45] Date of Patent: Dec. 8, 1987

[54] COMPACT HEAD-UP DISPLAY

[75] Inventor: Juris Upatnieks, Ann Arbor, Mich.

[73] Assignee: Environmental Research Institute of Michigan, Ann Arbor, Mich.

[21] Appl. No.: 754,406

[22] Filed: Jul. 12, 1985

[51] Int. Cl.$^4$ .......................... G02B 5/32; G02B 27/10
[52] U.S. Cl. ........................................ 350/3.7; 350/174
[58] Field of Search ................................. 350/174, 3.7

[56] References Cited

U.S. PATENT DOCUMENTS 4,309,070 1/1982 St. Leger Searle .................. 350/3.7
4,314,283 2/1982 Kramer ............................ 350/162 R

*Primary Examiner*—Bruce Y. Arnold
*Attorney, Agent, or Firm*—Krass & Young

[57] ABSTRACT

A compact head-up display comprising a combiner which combines light energy from an outside view with light energy transmitted within the combiner and diffracted out by means of an upper diffraction grating. The head-up display disclosed further comprises an image source, a collimating lens, and a lower diffraction grating for diffracting the collimated light energy into the combiner.

8 Claims, 5 Drawing Figures

COMPACT HEAD-UP DISPLAY

DESCRIPTION

1. Field of the Invention

This invention relates generally to head-up displays and, more particularly, to head-up displays having compact combiners.

2. Background of the Invention

Head-up displays superimpose images from two sources, the outside world and some second source, for presentation to an observer. Head-up displays are especially useful in aircraft because they relieve the pilot of the need to divert his attention from the view of the outside world through the windshield.

The image produced by the second source is typically a graphic display of symbols which relate to operating conditions of the aircraft and surrounding vehicles. The second source is generally a computer-controlled cathode ray tube (CRT). The CRT image is optically projected to an optical element interposed in the pilot's field of view. This optical element, called a combiner, is partially transmissive to light energy coming from the outside world, but also superimposes the symbology images which constitute the second source of information.

It is known in the prior art to pass the image created by the CRT through a relay lens, reflect it from a folding mirror, and pass it through a collimating lens to create an upwardly cast collimated image. This image could then be reflected by a partially silvered mirror serving as a combiner. The result is a superposition of the view of the outside world and a collimated image of the CRT, the collimated image appearing to originate at an infinite distance. The CRT and its related electronics may be placed to minimize physical interference with the pilot. However, the folding mirror must necessarily be close to the combiner, and they both must assume angles which cause reflection of the symbology image to the pilot. This further crowds the already congested pilot's cockpit and uses space which could hold additional instrumentation.

It is therefore advantageous to have a more compact substitute for the folding mirror-combiner assembly for use with head-up displays.

SUMMARY OF THE INVENTION

This invention is a head-up display (HUD) having a compact combiner assembly. The assembly is an elongated optical element, such as a glass plate, having two diffractive elements—one at its lower end and one at its upper end. The upper end of the plate is placed between the location of the pilot's eyes and his view of the outside world, and light energy from the outside world passes directly through. The light energy produced by the source of symbology images is directed onto the lower diffractive element. This diffractive element redirects the light containing the CRT image to create wavefronts which are retained within the plate by means of reflection. This captured energy reflects from the opposing surfaces of the plate until it reaches the upper diffractive element. The upper diffractive element redirects the energy toward the pilot's eyes.

The diffractive elements may be either transmission- or reflection-type. Through proper choice of the thickness of the optical element, the captured light energy may be caused to reflect from the two parallel surfaces any desired integral number of times. The CRT image can be superimposed upon the pilot's view of the outside world by proper placement and sizing of the diffractive elements.

DETAILED DESCRIPTION OF THE PREFERRED EMBODIMENTS

Figure 1:
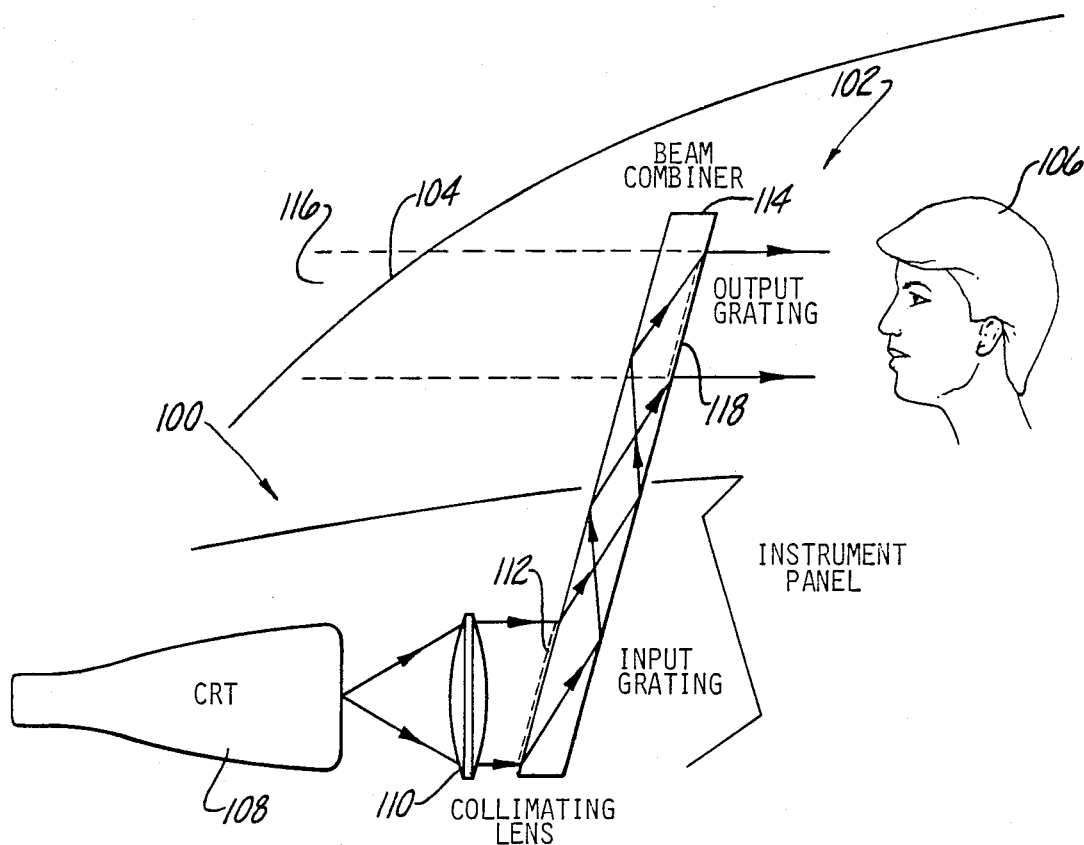
FIG. 1 is a schematic diagram of a preferred embodiment of the invention.

Referring now to FIG. 1 of the drawings, one skilled in the art will appreciate that HUD 100 is fixed in the cockpit area 102 of an aircraft having a windshield 104. HUD 100 provides pilot 106 with superimposed views of the outside world and symbologies created on CRT 108. The image created by CRT 108 passes through collimating lens 110, giving a collimated image of the symbologies.

The parallel light rays produced by collimating lens 110 are directed onto transmission diffraction grating 112. Diffraction grating 112 is attached to a portion of the lower surface of glass plate 114. The index of refraction of the glass plate, $n_g$, is greater than the index of refraction of air, $n_a$. Plate 114 has two parallel planar surfaces and is able to transmit light, such as light 116 from the outside world. The light of the CRT image which strikes diffraction grating 112 is redirected through an angle which causes it, now contained within plate 114, to experience total internal reflection from the surfaces of glass plate 114. In this case, light energy captured within plate 114 is retained within plate 114 until it strikes transmission diffraction grating 118. Grating 118 causes the light energy to diffract out of plate 114. The number of reflections which each light ray is subjected to is determined by the thickness of plate 114. The thinner plate 114 is made, the greater the number of reflections.

Figure 2:
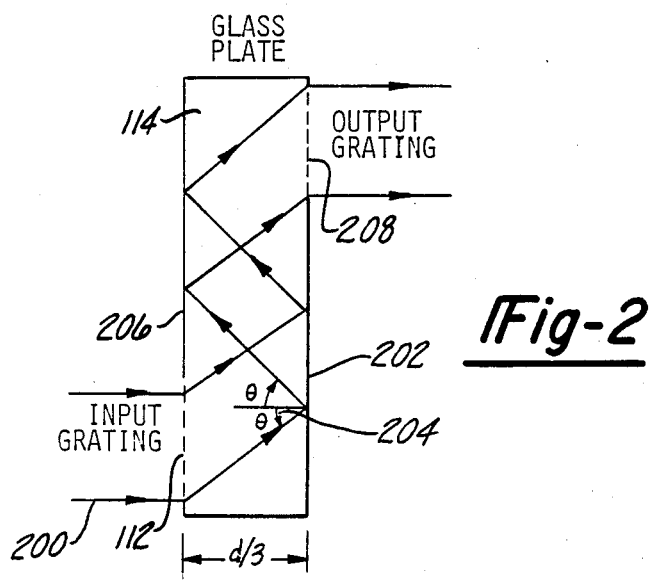
FIG. 2 is a schematic diagram of a combiner of the invention using two transmissive diffraction gratings.

FIG. 2 illustrates a combiner in which each light ray is reflected internally twice before it is diffracted out toward the pilot's eyes. Following diffraction of the light ray 200 by diffraction grating 112, ray 200 strikes surface 202 at an angle $\theta$ 204 as measured from a perpendicular to surface 202.

Whether ray 200 is reflected or refracted at this point is determined by Snell's law. In accordance with the formula $$\sin\phi = \frac{n_g}{n_a} \sin\theta$$

the light will be refracted out of the glass into the air at an angle $\phi$ as measured from a perpendicular to surface 202.

If $\theta$ is sufficiently large, the right hand side of the formula is greater than 1, since $n_g$ is greater than $n_a$. For $\theta$ sufficiently large, therefore, there is no $\phi$ which will satisfy Snell's law, and no light energy is refracted from the plate to the air. Total internal reflection is said to take place under these conditions.

The once-reflected light ray passes to surface 206 of plate 114. Surface 206 is parallel to surface 202 and, therefore, the light ray is again reflected. The twice-reflected light ray again strikes surface 202, this time at a portion of plate 114 which contains a transmissive diffraction grating 208. Grating 208 causes the light ray to diffract from plate 114, in a direction parallel to its path before striking plate 114.

The field of view and exit aperture of the head-up display of this invention are affected by direction of the input image rays. As the direction of the rays changes, the exit aperture of the head-up display moves up and down, causing a reduction in the effective exit aperture. It has been determined that for a maximum field of view a diffraction angle in the range of 45 to 55 degrees is desirable.

Figure 3:
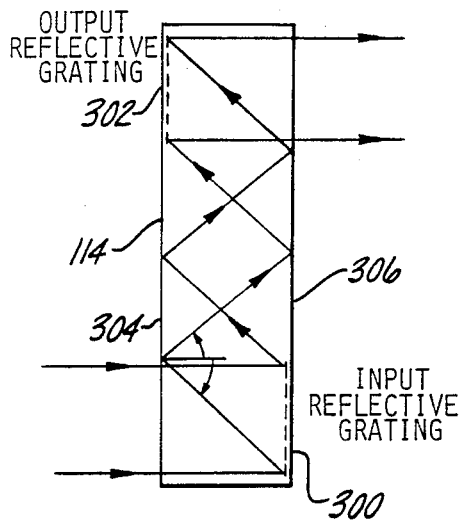
FIG. 3 is a schematic diagram of a combiner of the invention using two reflective diffraction gratings.

FIG. 3 of the drawings shows a second embodiment of plate 114. In this embodiment, diffraction gratings 300 and 302 are reflection diffraction gratings which typically have narrower spectral bandwidth and therefore higher white-light transmittance than transmission diffraction gratings. A light ray which refracts into plate 114 is transmitted to grating 300, which causes it to be diffracted upwardly into plate 114. The angle of diffraction caused by diffraction grating 300 is sufficiently large as measured from a perpendicular to surface 304 to cause total internal reflection to occur at this point. Surface 306 is parallel to surface 304; thus, the same geometric conditions apply to the once-reflected light ray when it reaches surface 306. Therefore, the light ray is again reflected. The twice-reflected light ray then passes to surface 304 of plate 114, this time striking reflection diffraction grating 302. Grating 302 diffracts the twice-reflected light ray in a direction parallel to its direction before striking plate 114. The higher white light transmittance of reflection grating 302 allows light from the outside world to pass through the combiner with less attenuation, creating a brighter overall display.

Figure 4:
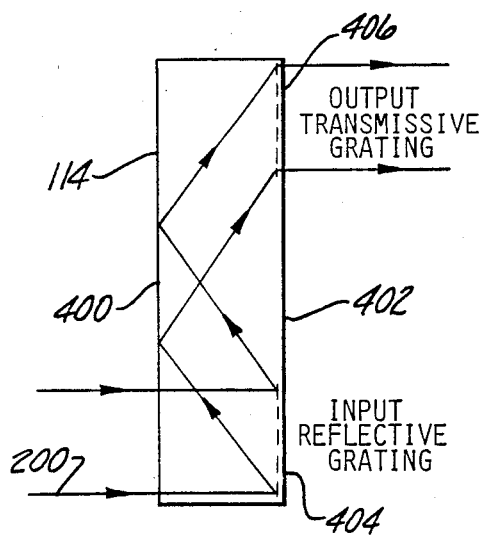
FIG. 4 is a schematic diagram of a combiner of the invention using one reflective and one transmissive diffraction grating.

As shown in FIG. 4 of the drawings, a third alternate embodiment of a compact HUD is created by using one reflection and one transmission diffraction grating. Light ray 200 strikes surface 400 of plate 114 where it is refracted, passing to the opposing surface 402. Light ray 200 then strikes a reflection diffraction grating 404 which causes the ray 200 to be diffracted toward surface 400 of plate 114. As with the other embodiments of plate 114, the diffracted light ray strikes surface 400 at such an angle as to cause total internal reflection, resulting in a reflected ray which passes toward surface 402. This portion of surface 402 is a transmission diffraction grating 406 which causes the once-reflected light ray to be diffracted out of plate 114. Light ray 200 exits plate 114 in a direction parallel to its direction when it first struck plate 114.

Figure 5:
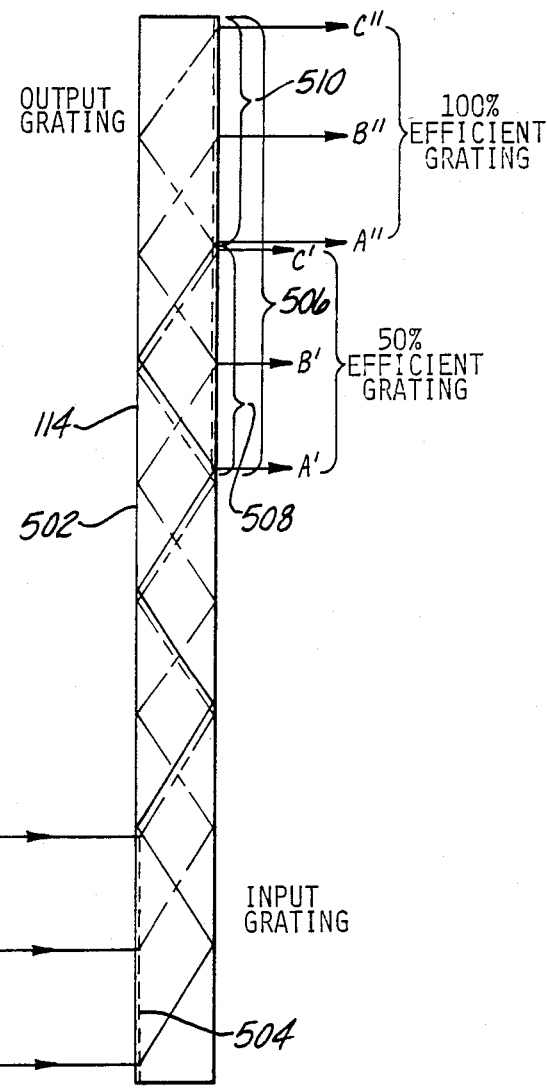
FIG. 5 is a schematic diagram of a combiner of the invention having an extended aperture.

FIG. 5 of the drawings shows an embodiment of plate 114 which provides an extended aperture. For purposes of illustration, both the entry and exit diffraction gratings are illustrated as transmission diffraction gratings. It will, however, be understood by one skilled in the art that in an alternative embodiment either or both of the reflection diffraction gratings can be replaced by a transmission diffraction grating.

Light rays A, B, and C strike surface 502 of plate 114. A portion of surface 502 contains transmission diffraction grating 504, causing a diffraction of the light rays toward the upper portion of plate 114. As described before, each of these light rays experiences total internal reflection four times, until it strikes transmission diffraction grating 506.

Diffraction grating 506 consists of two parts. The first part, diffraction grating 508, is of the same size as grating 504, but has only 50 percent transmission efficiency. The second part, grating 508, is also of the same size as diffraction grating 504, but is 100 percent efficient. Light rays which strike diffraction grating 508 experience an equal division of their energies. Half of the energy is diffracted out of plate 114, while the remaining half experiences total internal reflection toward surface 502. Upon being totally reflected from surface 502, the totally internally reflected energy then strikes diffraction grating 510, which diffracts all of the light energy out of plate 114. The result of this operation is to produce an output aperture twice the size of the input aperture.

The windshield of the aircraft can be used as that end of the combiner which transmits light energy from the outside world to the pilot and also diffracts the light energy reflected within the combiner to the pilot. The other end can be out of the field of view of the pilot.

A small input aperture can produce a large output aperture if the efficiency of the upper diffraction grating is kept low near the bottom and high near the top. Careful control of the input beam dimensions and the efficiency of the upper grating will result in a relatively uniform output light intensity. Distribution of the available input beam intensity over a larger output area will reduce the brightness of the output image. Therefore, reducing the thickness of plate 114 past the thickness which achieves a 100 percent efficient upper diffraction grating will cause a reduction in image brightness. One of the limiting factors in choosing plate thickness is the associated reduction in output image brightness.

The glass plate in the embodiments described above can be constructed from two plates of glass with another material, such as a liquid, between. The only restriction on this embodiment is that the liquid's index of refraction must be greater than that of the glass, to maintain the occurrence of total internal reflection at the glass-liquid interface. Also, the surfaces of the combiner are not necessarily parallel.

The reflections which occur within glass plate 114 may be alternatively accomplished by means of coating the outer surfaces with a layer of silver or the like, in the manner of an ordinary mirror, albeit at the loss of the high reflection efficiencies attained by total internal reflection. A gas or liquid can also be placed between the mirrored surfaces in this embodiment.

The transmission and reflection diffraction gratings may be produced holographically—that is, by interfering two planar wavefronts of light within a photographic emulsion placed on a glass plate and developing the emulsion. The glass plate used to carry the emulsion can be glass plate 114 described above or a separate glass plate which can be cemented, emulsion side in, to glass plate 114 after the emulsion has been developed. It is particularly advantageous to use a "thick" emulsion to create the diffraction gratings in a volume hologram, because such a diffraction grating can be made to diffract the light wavefronts in the desired direction with any desired degree of efficiency up to essentially 100 percent. The high spatial frequency of the diffraction gratings assures that flare from sunlight diffracted by the grating is not visible. Any sunlight diffracted by the gratings would be confined to the interior of plate 114 by total internal reflection. Further, the achromaticity of diffraction gratings assures that all parallel input light rays remain parallel at the display output regardless of their color.

Other modifications of the present invention will become apparent to one skilled in the art after a study of the drawings, specification and the following claims. Such modifications are deemed to be within the spirit and scope of the invention as defined by these claims.

I claim:

1. A head-up display for use in an aircraft cockpit having a windshield, comprising:
   source means for producing collimated light wavefronts of an image to be displayed to the pilot;
   an elongated optical element having a first end disposed in the path of the collimated light wavefronts produced by the source means, a second end disposed in the field of view of the pilot through the windshield, and operative to internally reflect optical wavefronts from the first end to the second end;
   a first diffractive element supported at the first end of the optical element so that the collimated light wavefronts produced by the source means are incident upon the first diffractive element, the first diffractive element being operative to diffract the light wavefronts into the optical element, and
   a second diffractive element supported at the second end of the optical element operative to diffract the light wavefronts, diffracted into the optical element by the first diffractive element, out of the optical element in the direction of the pilot's eye, while retaining the collimation thereof, the second end of the optical element and the second diffractive element being substantially transparent to light incident on the optical element from the field of view of the pilot through the windshield, whereby the pilot views in the image produced by the source means superimposed on his view through the windshield.

2. The head-up display of claim 1, wherein the elongated optical element has two parallel planar external surfaces, one directed toward the pilot and the other directed away from the pilot.

3. The head-up display of claim 2, wherein both of said diffractive elements are transmission diffraction gratings.

4. The head-up display of claim 2, wherein both of said diffractive elements are reflection diffraction gratings.

5. The head-up display of claim 2, wherein the first diffractive element is a transmission diffraction grating and the second diffractive element is a reflection diffraction grating.

6. The head-up display of claim 2, wherein the first diffractive element is a reflection diffraction grating and the second diffractive element is a transmission diffraction grating.

7. A head-up display for use in an aircraft cockpit having a windshield, comprising:
   source means for producing collimated light wavefronts of an image to be displayed to the pilot, comprising a cathode ray tube image source and means operative to collimate the image produced by the cathode ray tube image source;
   a relatively thin optical element having a first portion disposed to intercept the collimated light wavefronts produced by the source means, a second portion disposed in the field of view of the pilot when looking in a forward direction, and operative to transmit light wavefronts from the first portion to the second portion by total internal reflection;
   a first transmission diffraction grating at the first portion of the optical element, operative to diffract the collimated light wavefronts into the optical element; and
   a second transmission diffraction grating at the second portion of the optical element, operative to diffract the wavefronts, diffracted into the optical element by the first diffractive element, out of the optical element in the direction of the pilot's eye, the second portion of the optical element and the second transmission diffraction grating being substantially transparent to light incident the second portion of the optical element from the direction of the field of view of the pilot when looking in the forward direction, whereby the pilot views the image produced by the source means superimposed on his view through the windshield.

8. The head-up display of claim 7, wherein the windshield comprises the optical element.

* * * * *